United States Patent [19]

Laughner et al.

[11] Patent Number: 4,983,648

[45] Date of Patent: Jan. 8, 1991

[54] PREPARATION OF ADDITIVE MODIFIED THERMOPLASTIC BLEND

[75] Inventors: Michael K. Laughner; Kenneth R. Shaw; Ronald R. Smith, all of Lake Jackson, Tex.

[73] Assignee: The Dow Chemical Company, Midland, Mich.

[21] Appl. No.: 346,262

[22] Filed: May 1, 1989

Related U.S. Application Data

[63] Continuation of Ser. No. 141,184, Mar. 9, 1988, abandoned.

[51] Int. Cl.$^5$ .......................... C08J 3/22; C08L 69/00
[52] U.S. Cl. .................................. 523/351; 524/504; 264/37; 264/328.18
[58] Field of Search .................. 523/351; 525/67; 264/37, 211, 211.23, 328.18; 524/504

[56] References Cited

U.S. PATENT DOCUMENTS

| | | | |
|---|---|---|---|
| 3,162,695 | 12/1964 | Grabowski | 525/67 |
| 3,507,951 | 4/1970 | Morecroft | 264/349 |
| 3,663,471 | 5/1972 | Schirmer et al. | 525/67 |
| 3,852,394 | 12/1974 | Kubota et al. | 525/67 |
| 3,954,905 | 5/1976 | Margotte et al. | 525/67 |
| 4,180,494 | 12/1979 | Fromuth et al. | 525/63 |
| 4,424,303 | 1/1984 | Liu | 525/67 |
| 4,464,487 | 10/1984 | Thomas | 523/351 |
| 4,487,881 | 12/1984 | Rawlings | 525/67 |
| 4,579,905 | 4/1986 | Krabbenhoft | 525/67 |
| 4,607,079 | 8/1986 | Giles, Jr. et al. | 525/67 |
| 4,617,345 | 10/1986 | Sederel | 525/67 |

FOREIGN PATENT DOCUMENTS 265345 11/1987 Japan .

Primary Examiner—John C. Bleutge
Assistant Examiner—David Buttner

[57] ABSTRACT

Additive modified blends of thermoplastic resins are prepared by combining rubber modified polycarbonate or aromatic polyester carbonate containing concentrate resin with a let-down resin and/or regrind resin.

9 Claims, No Drawings

CROSS-REFERENCE TO RELATED APPLICATION

CROSS-REFERENCE TO RELATED APPLICATION

This is a continuation of application Ser. No. 141,184, filed Mar. 9, 1988, now abandoned.

BACKGROUND OF THE INVENTION

The present invention relates to a process for the preparation of an additive modified thermoplastic. More particularly, the present invention relate to a process for preparing a concentrated additive modified thermoplastic polycarbonate resin, aromatic polyester carbonate resin or mixture of polycarbonate and aromatic polyester carbonate resin and thereafter blending this concentrate with a thermoplastic resin to prepare the desired resin blend.

Manufacturers of molded parts from thermoplastic resins are frequently called upon to prepare objects utilizing a wide variety of different additive modified thermoplastic polymers. It has been frequently the practice in the past for resin suppliers to prepare and supply completely formulated resin blends meeting the desired end use applications of the molder. Recent experience has indicated that a more efficient technique is to supply smaller quantities of concentrated resin blends (referred to as a "concentrate") to a party desiring to prepare an additive modified blend and thereafter the desired additive containing resin may be prepared by mixing or "letting down" the concentrate with quantities of an unmodified thermoplastic resin (let down resin). With this technique it has been possible to realize significant economies in raw material usage, working capital, transportation, storage, and other costs as well as to realize increased flexibility in the supply of desired additive modified blends.

In the preparation of additive modified thermoplastics incorporating polycarbonate resins, aromatic polyester carbonate resins, mixtures of polycarbonate and aromatic polyester carbonate resins, and mixtures of the foregoing with other resins such as polyesters, polyphenylene oxide, ABS resins, etc., it has been discovered that often the resulting properties of the blend prepared by an on-site blending of an additive containing concentrate and a let-down resin are adversely affected. In particular, it has been discovered that impact properties as measured by Izod impact, Gardener impact, Dart drop or other instrumented impact measurement may be deleteriously affected. For example, in one particular embodiment of the present invention, it is desirable to combine the additive concentrate and the let-down resin in a molding machine or other suitable blending device immediately prior to the molding of objects therefrom. This operation is known as "direct molding". However, available equipment is designed to melt the resin and not necessarily obtain thorough mixing and thus direct molding often fails to obtain complete and adequate dispersion of the let-down resin and the additive concentrate. It has now been discovered that the resulting molded part prepared by direct molding often does not achieve impact properties as high as would be desired. Addition of a mixing nozzle or similar device may overcome some of these difficulties, however, a continued need for improvement still exists.

A second application for the present invention concerns the utilization of scrap resins obtained by trimming of excess resin from molded parts or by recycling defective plastic parts (referred to in the industry as "regrind" resin). In order to improve efficiency, it is highly desirable to reincorporate such regrind into the molten extrudate used in the molding process. Effective blending of such regrind resins which may include paint and other contaminants is often not possible utilizing the molding machines or even extruders or other mixing equipment presently available. As a result, molded objects incorporating regrind often fail to exhibit physical properties, particularly impact properties, as high as are obtained b objects prepared from virgin resins.

A final problem in the industry occurs in the preparation of the concentrate resins. Resins containing high levels of additives often are deficient in desired properties. For example, in the melt processing of such concentrates "surging" which is a variation in the amount of molten resin passing from the extruder or other malaxing device may be encountered. Also, "strand drops" or slubs may form in the strands of molten thermoplastic to be pelletized or otherwise comminuted.

It would be desirable if there were provided a technique allowing for the facile preparation of additive modified thermoplastic polymers by blending concentrates of polycarbonate resins, aromatic polyester carbonate resins or mixtures thereof with a let-down resin which overcomes the above stated deficiencies.

It would further be desirable to provide a process which permits the incorporation of regrind into a molding resin without resulting in a loss of physical properties in molded objects prepared therefrom.

SUMMARY OF THE INVENTION

According to the present invention, there is now provided a process for preparing molded objects comprising:

(1) providing a concentrate resin comprising (a) a polycarbonate resin, an aromatic polyester carbonate resin, or a mixture thereof: (b) at least one additive selected from the group consisting of colorants, pigments, thermal stabilizers, ultraviolet stabilizers, radiation stabilizers, mold release additives, ignition resistant additives, fillers, reinforcing aids, blowing agents, plasticizers, flow enhancers, lubricants, anti-fogging agents, anti-static compositions, anti-blocking compounds, and biocidal agents: and (c) a rubbery polymer:

(2) providing a let-down resin comprising a thermoplastic resin that is substantially free of additives and capable of dispersing the concentrate resin;

(3) combining the concentrate resin and let-down resin in a weight ratio from about 1:200 to about 1:3 in a molding machine used to prepare molded thermoplastic objects.

In a further embodiment of the invention there is provided a process for preparing molded objects comprising:

(1) providing a concentrate resin comprising (a) a polycarbonate resin, an aromatic polyester carbonate resin, or a mixture thereof: (b) at least one additive selected from the group consisting of colorants, pigments, thermal stabilizers, ultraviolet stabilizers, radiation stabilizers, mold release additives, ignition resistant additives, fillers, reinforcing aids, blowing agents, plasticizers, flow enhancers, lubricants, antifogging agents, anti-static compositions, anti-blocking compounds, and biocidal agents; and (c) a rubbery polymer:

(2) providing a regrind resin comprising a comminuted thermoplastic molded or extruded article said thermoplastic being capable of dispersing the concentrate resin:

(3) combining the concentrate resin and regrind resin in a weight ratio from about 1:50 to about 1:3 in a molding machine or extruder to provide a thermoplastic blend: and (4) preparing a molded object from the thermoplastic blend.

DETAILED DESCRIPTION OF THE INVENTION

Suitable rubbery polymers for use according to the present invention include the homopolymers and copolymers of conjugated dienes, homopolymers and copolymers of alpha olefins, homopolymers and copolymers of $C_{1-8}$ alkyl acrylates and methacrylates, graft copolymers thereof, and mixtures thereof. Preferably such rubbery polymers have a glass transition temperature ($T_g$) of less than about 25° C. Most preferred rubbery polymers are graft copolymers of rubbery substrate polymers. Suitable rubbery substrate polymers include homopolymers and copolymers of butadiene or isoprene wherein the comonomer is selected from the group consisting of styrene, acrylonitrile, methyl methacrylate and mixtures thereof: homopolymers of $C_{4-8}$ alkyl acrylates or copolymers of $C_{4-8}$ alkyl acrylates with one or more copolymerizable comonomers: and rubbery olefin polymers especially ethylene/propylene or ethylene/propylene/diene copolymers. Suitable grafting polymers are selected from homopolymers of vinyl aromatic monomers or $C_{1-4}$ alkyl methacrylate monomers, or copolymers thereof and copolymers of the above monomers with other ethylenically unsaturated comonomers, especially acrylonitrile.

Preferred rubbery polymers are the acrylate multiphase composite interpolymers which comprise a $C_1$-$C_5$ acrylate and $C_{1-5}$ methacrylate as disclosed in U.S. Pat. No. 4,260,693 and U.S. Patent No. 4,096,202 both of which are incorporated herein by reference. These interpolymers comprise about 25-95 weight percent of a first elastomeric phase and about 75 to about 5 weight percent of a final rigid thermoplastic phase. One or more intermediate phases are optional, for example a middle stage polymerized from about 75 to 100 percent by weight styrene. The first stage is polymerized from about 75 to 99.8 weight percent of a C1-6 alkyl acrylate resulting in an acrylic rubber core and crosslinked with 0.1 to 5 weight percent crosslinking monomer and further containing 0.1 to 5 percent by weight graftlinking monomer. The preferred alkyl acrylate is n-butyl acrylate.

The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like: di- and trivinyl benzene, vinyl acrylate and methacrylate, and the like. The preferred crosslinking monomer is butylene diacrylate.

The crosslinking monomer is a polyethylenically unsaturated monomer having a plurality of addition polymerizable reactive groups, at least one of which polymerizes at a substantially different rate of polymerization from at least one of the other reactive groups. The function of the graftlinking monomer is to provide a residual level of unsaturation in the elastomeric phase, particularly in the latter stages of polymerization and, consequently, at or near the surface of the elastomer particles. Among the effective graftlinking monomers are allyl group-containing monomers such as allyl esters of ethylenically unsaturated acids such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate an diallyl maleate.

A preferred interpolymer has only two stages, the first stage comprising about 60 to 95 percent by weight of the interpolymer and being polymerized from a monomer system comprising 95 to 99.8 percent by weight n-butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate.

A preferred multiphase composite interpolymer of the foregoing description is commercially available from Rohm and Haas Company as the Paraloid ® EXL 3300 series of resins. These interpolymers have a weight ratio of about 4 parts n-butyl acrylate to about 1 part methyl methacrylate, the remainder of the weight being provided by the crosslinking and graftlinking agents.

In addition to the acrylate rubbers, another preferred class of rubbery polymers, particularly for use in preparing colored resins, comprises graft copolymers of a vinyl aromatic monomer and an alkyl methacrylate on a diene based rubbery substrate. Suitable diene based rubbery substrates include homopolymers of butadiene and copolymers thereof with up to about 50 percent by weight of a copolymerizable comonomer, particularly styrene. Preferred are graft copolymers of styrene and methyl methacrylate thereby giving rise to the description of such polymers as methacrylate/butadiene/styrene or MBS polymers. Suitable MBS polymers are available commercially from Rohm and Haas Company under the trade designation Paraloid ® EXL 3600.

The rubber is preferably incorporated into the concentrate in an amount from 0.1% to 50%, more preferably from about 5.0% to 50%, and most preferably from 8.0% to 45%, based on the total weight of the concentrate resin. Preferred rubbers have a number average particle size less than 0.5 $\mu$, more preferably less than 0.3 $\mu$. An especially preferred rubber is of the MBS type having a number average particle size less than 0.2 $\mu$. These rubbers are available from M & T Chemicals under the trade designation Metablen C-223.

The polycarbonates that can be employed in the practice of this invention are homopolymers and copolymers and mixtures thereof that are prepared by reacting a dihydric phenol with a carbonate precursor.

The dihydric phenols that can be employed are bisphenols such as bis(4-hydroxyphenyl)methane, 2,2bis(4-hydroxyphenyl)propane (bisphenol-A), 2,2-bis(4-hydroxy-3-methylphenyl)propane, 4,4-bis(4-hydroxyphenyl)heptane, 2,2-bis(4-hydroxy-3,5-dichlorophenyl)-propane, 2,2-bis(4-hydroxy-3,5-dibromophenyl)propane, etc.; dihydric phenol ethers such as bis(4-hydroxyphenyl)ether, bis(3,5-dichloro-4-hydroxylphenyl)ether, etc.; dihydroxydiphenyls such as p,p'-dihydroxydiphenyl, 3,3'-dichloro-4,4-dihydroxydiphenyl, etc.; dihydroxyaryl sulfones such as hydroxypenyl)sulfone, etc.: dihydroxy benzenes, resorcinol, hydroquinone, halo- and alkyl-substituted dihydroxy benzenes such as 1,4-dihydroxy-2,5- dichlorobenzene, 1,4-dihydroxy-3-methylbenzene, xylenols, etc.; dihydroxy diphenyl sulfoxides such as bis(4-hydroxyphenyl)sulfoxide, bis(3,5-dibromo-4-hydroxyphenyl)sulfoxide, etc. A variety of additional dihydric phenols are also available to provide carbonate polymers such as are disclosed in U.S. Pat. Nos. 2,99,835, 3,028,365 and 3,153,008. Also suitable for preparing the polycarbonates are halogen-containing dihydric phenols such as 2,2-bis(3,5-dichloro-4-hydroxyphenyl)propane, 2,2-bis(3,5-dibromo-4-hydroxyphenyl)propane, etc. It is also possible to employ two or more different dihydric phenols or a copolymer of a dihydric phenol with a glycol or with a hydroxy or acid terminated polyester, or with a dibasic acid in the event a copolymer or interpolymer rather than a homopolymer is desired.

The carbonate precursor can be either a carbonyl halide, a carbonate ester or a haloformate. The carbonyl halides which can be employed are carbonyl bromide, carbonyl chloride and mixtures thereof. Typical of the carbonate esters that can be employed are diphenyl carbonate, di-(halophenyl) carbonates such as di(-chlorophenyl)carbonate, di-(bromophenyl) carbonate, di-(trichlorophenyl) carbonate, di(tribromophenyl)carbonate, etc.: di-(alkylphenyl) carbonate such as di-(tolyl) carbonate, etc., di(naphthyl) carbonate, di(-chloronaphthyl) carbonate, phenyl tolyl carbonate, chlorophenyl chloronaphthyl carbonate, etc., or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride or trimellitic acid, or their haloformyl derivatives.

Also included herein are blends of a branched polycarbonate, a linear polycarbonate and/or an aromatic polyester carbonate.

Aromatic polyester carbonates for use according to the present invention include the polymeric derivatives formed by reaction of a di-hydric phenol, one or more dicarboxylic acids or acid anhydrides and a carbonate precursor. These are disclosed in U.S. Pat. No. 3,169,121 which is incorporated herein by reference. Of course, blends of more than one polycarbonate or aromatic polyester carbonate may also be employed.

The polycarbonates and aromatic polyester carbonates may be prepared by employing a molecular weight regulator, an acid acceptor and a catalyst. The molecular weight regulators which can be employed include monohydric phenols such as phenol, chroman-I, para-tertiary-butyl-phenol, parabromophenol, primary and secondary amines, etc. Preferably, para t-butyl phenol is employed as the molecular weight regulator.

A suitable acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of a alkali or alkaline earth metal.

The catalysts which can be employed can be any of the suitable catalysts that aid the polymerization of the dihydric phenol and carbonate precursor. Suitable catalysts include tertiary amines such as triethylamine, tripropylamine, N,N-dimethylaniline, quaternary ammonium compounds such as tetraethylammonium bromide, cetyl triethylammonium bromide, tetra-n-heptylammonium iodide, tetra-n-propylammonium bromide, tetramethyl-ammonium chloride, tetramethylammonium hydroxide, tetra-n-butylammonium iodide, benzyl trimethylammonium chloride and quaternary phosphonium compounds such as n-butyltriphenyl phosphonium bromide and methyltriphenyl phosphonium bromide.

Additives incorporated into the additive modified blend according to the present invention include the conventionally additives, modifiers and adjuvants well known in the art. In particular regards to the use of colorants such as dyes and pigments, it has been discovered that particularly beneficial results are obtained in combination with a MBS rubber having particle size (number average) less than 0.5 $\mu$ preferably less than 0.3 $\mu$. The best reproducability of colored tints has been obtained by the inclusion of such an MBS rubber. In addition, an apparantly previously unknown degredation of the polycarbonate resin caused by the presence of certain pigments has been discovered to be reduced or even eliminated due to the presence of the rubber.

By the term fillers is included talc, clay, mica, or glass microspheres or flakes and other extenders, and electrically conductive fillers, e.g. stainless steel powder, etc. Reinforcing aids include organic or inorganic fibers, carbon fibers, glass fibers, etc. Blowing agents include the azo and chlorofluorocarbon blowing agents. Plasticizers include the well known phthalates, etc. Ignition resistant additives include fibril forming polytetrafluoroethylene polymers, metal sulfates, and metal bisulfates, phosphate esters and halogenated compounds. Flow enhancers includes low molecular weight polymers and waxes such as polyethylene wax. Lubricants include the alkali metal and alkaline earth metal stearates and mineral oil. Biocidal agents include antimicrobial and anti-fungal agents.

Anti-static agents are added to increase surface conductivity while anti-blocking aids may be added to decrease sticking of surfaces of objects placed adjacent to one another.

The above additives are employed in relatively large amounts taking into consideration the fact that the concentrate is meant to be diluted with additional resin to produce the ultimate product. Generally, total amounts of additives from about 0.1% to 60.0% based on total concentrate weight are employed.

The thermoplastic resins employed as let-down resins include any thermoplastic resin that is capable of blending with the above mentioned concentrate resins to form a well dispersed blend. By the term "well dispersed" is meant the blend does not demonstrate visible inhomogeneous regions. Suitable thermoplastic resins include the aforementioned polycarbonates: aromatic polyester carbonates; homopolymers or nterpolymers of vinylaromatic monomers, $C_{1-6}$ alkyl methacrylates or ethylenically unsaturated nitriles, and rubber modified homopolymers or interpolymers thereof; polyester resins; polyarylene ethers; acetals; isoplasts; polyamides; and mixtures of the forgoing. Examples include: polystyrene; rubber-modified polystyrene wherein the rubber is a diene homopolymer or copolymer, an ethylene/propylene copolymer or an ethylene/propylene/diene terpolymer; styrene/acrylonitrile; rubber modified styrene/acrylonitrile (ABS, AES, etc.); polyethylene terephthalate; polybutylene terephthalate; polyphenylene ether; etc.

Regrind resin will, of course, comprise the recycled thermoplastic resin utilized to prepare molded or extruded objects which is recycled to avoid waste. Such regrind may include small amounts of additives utilized in the process under consideration. Suitable thermoplastic resins include those resin of the previously disclosed list. Often in the use of regrind a dark colored pigment may be added to the concentrate to provide a uniform color to the resulting molded object. Carbon black is often selected as such a pigment. In an optional embodiment amounts of a virgin resin (let-down resin) may be included in the blend.

In a preferred embodiment of the present invention, the additive concentrate and let-down and/or regrind resin are combined in a weight ratio of from 1:100 to about 1:4. It is further preferred to employ the regrind in an amount from about 50% by weight to about 100% by weight based on combined weight of regrind and let-down resin.

EXAMPLES 1 and 2 and COMPARATIVE 1,2

Having described the invention, the following examples are provided as further illustrative and are not to be construed as limiting. In Example 1 and Comparative 1 and 2, concentrates are prepared utilizing a bisphenol A polycarbonate having a weight average molecular weight (Mw) of 20,000 and containing various pigments. The concentrates differ in that Example 1 additionally contains a rubber (Paraloid ® 3607) available from Rohm and Haas Company, whereas comparative 1 contains no rubber. The concentrates are compounded by single passes through a Werner-Pfeiderer twin screw extruder under the conditions specified in Table I. There after these concentrates were combined with a commercially available, unmodified bisphenol-A polycarbonate let-down resin (Mw-28,000) in the ratio of 25 parts by weight let-down resin to 1 part by weight concentrate and utilized to prepare injection molded objects. The let-down operation is accomplished by mixing the concentrate and let-down resin and charging the mixture to a 750 ton Cincinnati Milicron Injection Molding apparatus operating under the conditions specified in Table II. Molding conditions are contained in Table III.

A well compounded additive containing resin (Comparative 2) is also prepared utilizing the same polycarbonate resin employed as the above described polycarbonate let-down resin The resin is blended thoroughly according to conventional processing techniques.

The resin utilized in Example 2 is prepared substantially according to the procedure described for Example 1 excepting that the resin employed in preparing the concentrate is a blend of a bisphenol-A polycarbonate and an ABS resin (Pulse ® 830, available from The Dow Chemical Company).

Molded test bars prepared in the above described manner where then tested for physical properties. The results are contained in Table IV. Unless stated to the contrary, all parts are expressed in parts by weight.

TABLE I

| | (composition) | | | |
|---|---|---|---|---|
| | Ex 1 | Ex 2 | Comp. 1 | Comp. 2 |
| PC* | — | — | — | 99.026 |
| PC** | 70.68 | 47.5 | 83.68 | — |
| Epoxidized Soybean Oil | 0.10 | 0.10 | 0.10 | 0.10 |
| Carbon Black | 2.08 | — | 2.08 | 0.08 |
| TiO$_2$ | 13.00 | 26.0 | 13.00 | 0.50 |
| Cadmium Yellow | 0.23 | — | 0.23 | 0.009 |
| Phthalyl Green | 0.91 | — | 0.91 | 0.035 |
| Rubber | 13.0 | 26.0 | — | — |
| Antioxidant | — | 0.4 | — | 0.25 |

*bisphenol A homopolycarbonate Mw-28,000
**bisphenol A homopolycarboante Mw-20,000

TABLE II

| | (Compounding conditions) | | | |
|---|---|---|---|---|
| | Ex 1 | Ex 2 | Comp. 1 | Comp. 2 |
| Screw Speed (Rpm) | 300 | 200 | 300 | 300 |
| % Torque | 78 | 60 | 85 | 80 |
| Temp. °C. | | | | |
| Zone 1 | 243 | 233 | 229 | 248 |
| Zone 2 | 257 | 253 | 252 | 265 |
| Zone 3 | 274 | 262 | 269 | 277 |
| Zone 4 | 276 | 269 | 274 | 275 |
| Melt | 282 | 275 | 278 | 289 |

TABLE III

| | (Molding Conditions) | | | |
|---|---|---|---|---|
| | Ex. 1 | Ex. 2 | Comp. 1 | Comp. 2 |
| Ratio let down: concentrate | 25:1 | 25:1 | 25:1 | — |
| Screw Speed (Rpm) | 30 | 20 | 30 | 30 |
| Temp. °C. | | | | |
| Exit | 254 | 265 | 254 | 254 |
| Zone 2 | 263 | 268 | 263 | 263 |
| Zone 3 | 271 | 271 | 271 | 271 |
| Zone 4 (rear) | 277 | 270 | 277 | 277 |
| Mold | 54 | 77 | 54 | 54 |

TABLE IV

| | (Physical Properties) | | | |
|---|---|---|---|---|
| | Ex. 1 | Ex. 2 | Comp. 1 | Comp. 2 |
| Dart drop 10 ft/lbs. % pass | 93.3 | — | 26.7 | 73.3 |
| pigment dispersion | good | good | good | good |

It may be seen by the comparing the preceding results that inefficient mixing of concentrate resin and let down resin occurs when letting-down concentrate directly prior to molding in an injection molding machine. This is evidenced by the poor impact properties of comparative 1 in relation to comparative 2. However, example 1 demonstrates good impact properties due to the additional presence of the rubber impact modifier. Thus by incorporating rubber along with the pigment or other additives in the concentrated resin it is possible for the manufacturer to produce acceptable molded objects by combining a natural resin, i.e. a resin lacking in substantial quantities of additives, and small quantities of concentrate resin containing the desired quantity of pigments, stabilizers, fire retardants or other additives. This procedure reduces substantially the amount of fully formulated resin which a manufacturer must keep in inventory in order to prepare the desired molded objects, thereby allowing the achievement of greater economy and efficiency as well as flexibility in manufacture.

It should also be mentioned that the concentrated resin containing rubber (Ex. 1) demonstrates a higher elastic modulus resulting in improved melt strength giving improved uniformity (less surging and strand drops) during extruder processing and pelletizing thereof. Moreover, at high shear rates the concentrate demonstrates viscosities similar to those of resins lacking rubber modifiers. At low shear rates the rubber modified concentrate demonstrates higher viscosity and improved melt strength thereby explaining the improvement in pelletizing performance.

The concentrate resin made from a blend of polycarbonate resin and ABS (Example 2) demonstrated 100% ductile failure at −20° F. (−29° C.) for a 10 mil (0.25mm) thick specimen, indicating good commercial properties in the resulting blend prepared utilizing merely a single pass through the molding machine.

What is claimed is:

1. A process for preparing molded objects comprising:
   (1) providing a concentrate resin comprising (a) a polycarbonate resin, an aromatic polyester carbonate resin or a mixture thereof; (b) at least one additive selected from the group consisting of colorants, pigments, thermal stabilizers, ultraviolet stabilizers, radiation stabilizers, mold release additives, ignition resistant additives, fillers, reinforcing aids, blowing agents, plasticizers, flow enhancers, lubricants, anti-fogging agents, anti-static compositions, anti-blocking compounds, and biocidal agents; and (c) a rubbery polymer;
   (2) providing a let-down resin comprising a thermoplastic resin substantially free of additives that is capable of dispersing the concentrate resin;
   (3) melt combining the concentrate resin and let-down resin in a weight ratio from about 1:200 to about 1:3 in a molding machine used to prepare molded thermoplastic objects said molding machine being incapable of obtaining thorough dispersion of concentrate resin in the let-down resin unless the concentrate resin contains a rubbery polymer said molding machine not being an extruder; and
   (4) preparing a molded object from the combined resins by the direct molding thereof.

2. A process according to claim 1 wherein the rubbery polymer is a graft copolymer of styrene and methyl methacrylate on a diene based rubbery substrate.

3. A process according to claim 1 wherein the let-down resin consists essentially of a polycarbonate, an aromatic polyestercarbonate or a mixture thereof.

4. A process according to claim 1 wherein the amount of rubber in the concentrate resin is from about 0.1% by weight to about 50% by weight.

5. A process according to claim 1 wherein the rubber is in the form of particle having a number average particle size less than $0.5\mu$.

6. A process according to claim 1 wherein the amount of additives in the concentrate resin is from about 0.1% to about 60.0% by weight.

7. A process for preparing molded objects comprising:
   (1) providing a concentrate resin comprising (a) a polycarbonate resin, an aromatic polyester carbonate resin or a mixture thereof; (b) at least one additive selected from the group consisting of colorants, pigments, thermal stabilizers, ultraviolet stabilizers, radiation stabilizers, mold release additives, ignition resistant additives, fillers, reinforcing aids, blowing agents, plasticizers, flow enhancers, lubricants, anti-fogging agents, anti-static compositions, anti-blocking compounds and biocidal agents; and (c) a rubbery polymer;
   (2) providing a regrind resin comprising a comminuted thermoplastic molded or extruded article said thermoplastic being capable of dispersing the concentrate resin;
   (3) melt combining the concentrate resin and regrind resin in a weight ratio from about 1:200 to about 1:3 in a molding machine used to prepare molded thermoplastic objects said molding machine being incapable of obtaining thorough dispersion of concentrate resin in the regrind resin unless the concentrate resin contains a rubbery polymer said molding machine not being an extruder; and
   (4) preparing a molded object from the combined resins by the direction molding thereof.

8. The process of claim 7 wherein a let-down resin additionally is provided.

9. The process of claim 8 wherein the let-down resin consists essentially of a polycarbonate, an aromatic polyester carbonate or a mixture thereof.

* * * * *